United States Patent
Eriksson et al.

(10) Patent No.: US 9,628,770 B2
(45) Date of Patent: Apr. 18, 2017

(54) SYSTEM AND METHOD FOR STEREOSCOPIC 3-D RENDERING

(75) Inventors: Marcus Eriksson, Malmo (SE); Dan Zacharias Gardenfors, Malmo (SE)

(73) Assignee: BlackBerry Limited, Waterloo, Ontario (CA)

( * ) Notice: Subject to any disclaimer, the term of this patent is extended or adjusted under 35 U.S.C. 154(b) by 300 days.

(21) Appl. No.: 13/523,244

(22) Filed: Jun. 14, 2012

(65) Prior Publication Data

US 2013/0335402 A1    Dec. 19, 2013

(51) Int. Cl.
  *G06T 15/00* (2011.01)
  *H04N 13/00* (2006.01)

(52) U.S. Cl.
  CPC ..... *H04N 13/0033* (2013.01); *H04N 13/0022* (2013.01)

(58) Field of Classification Search
  CPC .... G06T 15/00; H04N 13/00; H04N 13/0033; H04N 13/0022
  USPC .......................................................... 345/419
  See application file for complete search history.

(56) References Cited

U.S. PATENT DOCUMENTS

| | | | |
|---|---|---|---|
| 5,109,425 A * | 4/1992 | Lawton | G06T 7/0071 348/25 |
| 6,028,608 A * | 2/2000 | Jenkins | G06T 1/0021 345/619 |
| 6,466,255 B1 * | 10/2002 | Kagita et al. | 348/42 |
| 6,487,304 B1 * | 11/2002 | Szeliski | G06K 9/20 382/107 |
| 7,394,916 B2 * | 7/2008 | Brodsky | G06K 9/32 348/142 |
| 2002/0191841 A1 * | 12/2002 | Harman | H04N 19/597 382/154 |
| 2003/0112503 A1 | 6/2003 | Lantin | |
| 2006/0002586 A1 * | 1/2006 | Aggarwal | G06K 9/00771 382/103 |
| 2006/0126919 A1 * | 6/2006 | Kitaura et al. | 382/154 |
| 2006/0268111 A1 * | 11/2006 | Zhang | G01S 3/7864 348/169 |
| 2008/0199070 A1 * | 8/2008 | Kim et al. | 382/154 |

(Continued)

FOREIGN PATENT DOCUMENTS

| | | |
|---|---|---|
| EP | 2106150 A2 | 9/2009 |
| EP | 2421269 | 2/2012 |
| EP | 2432238 | 3/2012 |

OTHER PUBLICATIONS

Extended European Search report mailed Oct. 19, 2012, in corresponding European patent application No. 12172065.0.

(Continued)

*Primary Examiner* — Jacinta M Crawford
*Assistant Examiner* — Terrell Robinson
(74) *Attorney, Agent, or Firm* — Fish & Richardson P.C.

(57) ABSTRACT

A method and system for rendering scenes in stereoscopic 3-D comprises identifying, or detecting, that a rate of change, of one or more elements of a scene to be rendered in stereoscopic 3-D, satisfies a criterion. The perceived depth of elements of the scene is then dynamically modified, and the scene is rendered. The method can reduce eye strain of a viewer of the scene, since the perceived difference in depth of objects or elements of the scene is reduced while the object is changing position or visibility dramatically.

20 Claims, 3 Drawing Sheets

(56) References Cited

U.S. PATENT DOCUMENTS

| | | | |
|---|---|---|---|
| 2011/0032341 A1* | 2/2011 | Ignatov | H04N 13/0033 |
| | | | 348/51 |
| 2011/0058019 A1* | 3/2011 | Onozawa | 348/43 |
| 2011/0091096 A1* | 4/2011 | Morris et al. | 382/154 |
| 2011/0109720 A1* | 5/2011 | Smolic | H04N 13/0011 |
| | | | 348/43 |
| 2011/0109723 A1* | 5/2011 | Ashbey | G06T 11/00 |
| | | | 348/44 |
| 2011/0109731 A1 | 5/2011 | Koo et al. | |
| 2011/0116771 A1 | 5/2011 | Ota et al. | |
| 2011/0142309 A1* | 6/2011 | Zhang et al. | 382/128 |
| 2012/0044246 A1 | 2/2012 | Morifuji et al. | |
| 2012/0120060 A1* | 5/2012 | Noda | 345/419 |
| 2012/0148147 A1* | 6/2012 | Ogata et al. | 382/154 |

OTHER PUBLICATIONS

Examination Report mailed Apr. 28, 2014; in European patent application No. 12172065.0.
Response filed on Mar. 14, 2013 to the Extended European Search report; in European patent application No. EP12172065.0.
Office Action issued in Canadian Application No. 2,818,537 on Jan. 20, 2015; 5 pages.
Office Action issued in Canadian Application No. 2,818,537 on Jul. 12, 2016.

* cited by examiner

SYSTEM AND METHOD FOR STEREOSCOPIC 3-D RENDERING

FIELD

The present disclosure relates generally to visual media. More particularly, the present disclosure relates to the rendering of visual content in stereoscopic 3-D (three-dimensional) imaging.

BACKGROUND

Using stereoscopic 3-D techniques, images and graphics can have a simulated depth on a two-dimensional (2-D) screen such as a television, projection screen, computer display, portable electronic device, or other display. When looking at graphics in stereoscopic 3-D, a viewer's eyes must adjust to appreciate different depths. If an object moves across the screen or appears on the screen only briefly, a viewer may experience eye strain due to the limited time available to adjust to the depth of the object in a scene. In pre-rendered content such as movies, an editor can adjust the stereoscopic 3-D effects of moving or transient objects in order to compensate for the speed of the moving objects, or their appearance and/or disappearance. However, in situations where content is being rendered in real-time, such as in video gaming, manual compensation may not be possible.

It is therefore desirable to provide improved systems and methods for rendering content in stereoscopic 3-D.

BRIEF DESCRIPTION OF THE DRAWINGS

Embodiments of the present disclosure will now be described, by way of example only, with reference to the attached Figures.

DETAILED DESCRIPTION

Figure 1A:
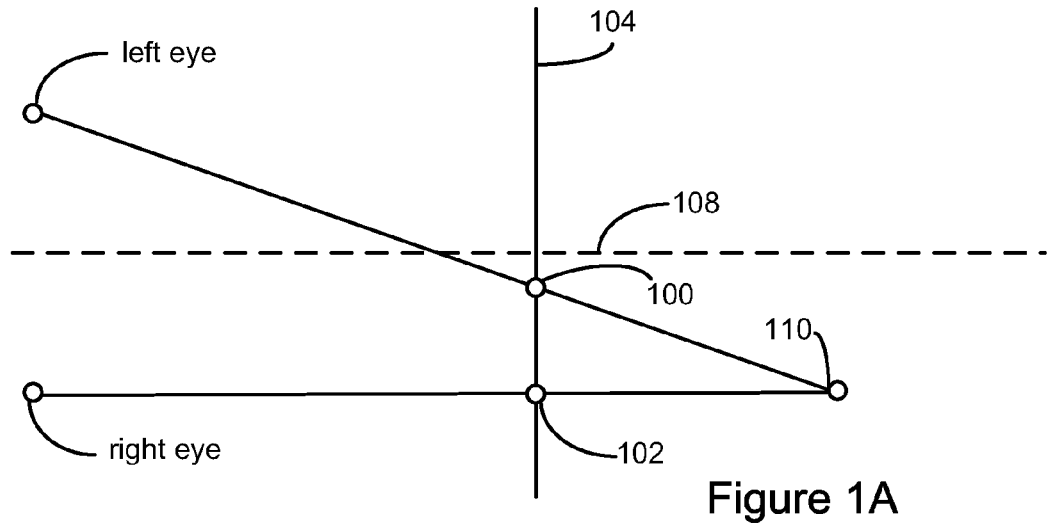
FIGS. 1A-1C illustrate perceived depth of an object in relation to a projection plane.

Stereoscopic or 3-D imaging is a technique for creating or enhancing an illusion of depth in an image by means of stereopsis. Most stereoscopic methods present two offset 2-D images, known as a stereo pair, separately to the left and right eye of a viewer. The offset 2-D images are then combined in the brain to give the perception of 3-D depth. Relying on the principles of stereopsis, 3-D images can be simulated on a 2-D screen, such as a television, projection screen, computer display, portable electronic device, or other display. The illusion of depth on a 2-D screen can be created by displaying a stereo pair of an object, or a scene containing multiple objects or elements, such that a viewer's right eye is presented with a right perspective image of an object while a viewer's left eye is presented with a left perspective image of an object.

Generally, stereoscopic 3-D systems mechanically present the left and right images to each eye. For example, filtering lenses may be used to present different images to each eye of a viewer. These filters can be color filters, polarizing filters, prism foils, or any other mechanical means of presenting separate images to a viewer's eyes. One of ordinary skill will appreciate that the techniques described herein are equally applicable to other forms of stereoscopic 3-D, such as autostereoscopy.

There are a number of cues used by the human visual system to perceive depth in an image, or scene. These cues include: perspective, where objects get smaller the further they are from the viewer; relative size of known objects; level of detail, where closer objects have greater visible detail; occlusion, where an object that blocks another is assumed to be in the foreground; lighting and shadow, where closer objects appear brighter, and distant objects appear dimmer; relative motion, where objects that are farther away appear to move more slowly than objects in the foreground; accommodation, which is the muscle tension required to adapt the focal length of the eyes to focus at a particular depth; and convergence, which is the muscle tension required to rotate each eye such that it is facing the focal point. A further cue exploited by stereoscopic 3-D systems is binocular disparity. Binocular disparity refers to the difference in the left and right images of an object seen by the left and right eyes, resulting from the eyes' horizontal separation (interocular distance). The visual cortex uses binocular disparity to extract depth information from the two-dimensional retinal images in stereopsis.

In computer-implemented stereoscopic systems, and as used herein, binocular disparity refers to the difference between the left and right images constituting a stereo pair, such as the difference in coordinates of, or offset between, similar features within two 2-D images constituting a stereo pair, and the difference in perspective views between the two images. As is known, computer-implemented stereoscopic 3-D rendering systems can generate and render the related views constituting a stereo pair with appropriate binocular disparity based on the information related to the depth, occlusion and transparency of the elements of a scene.

Figure 1B:
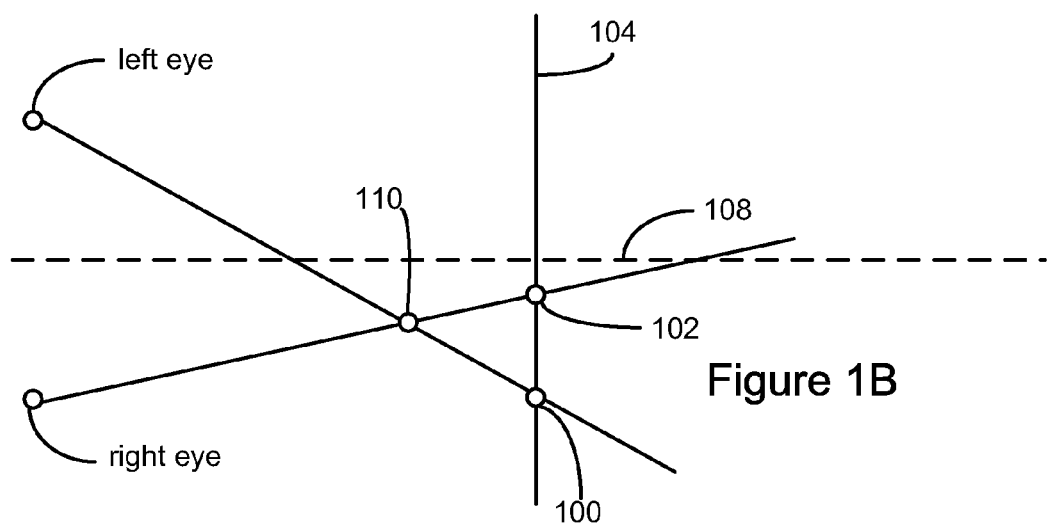
Figure 1C:
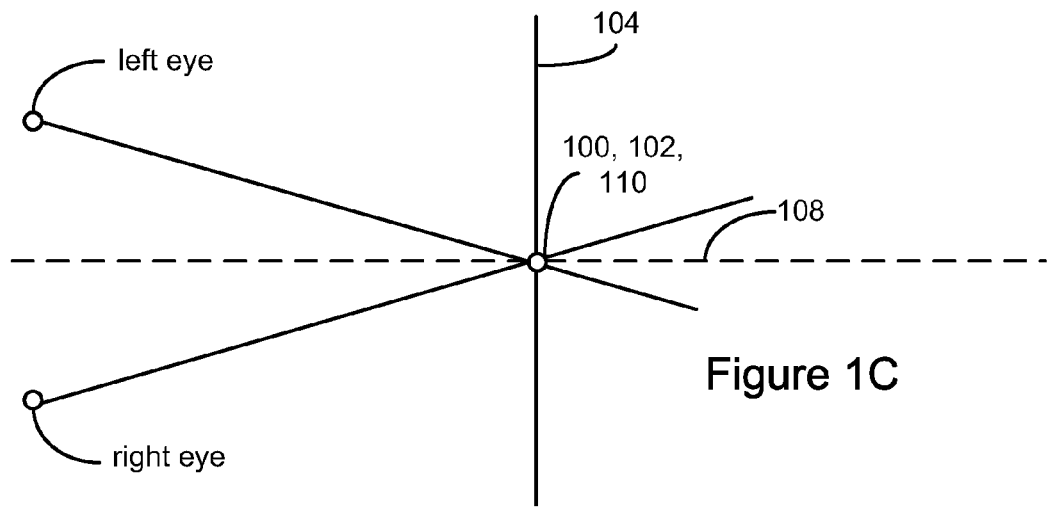

To render a stereo pair, two 2-D images of an object are created (one for each eye) in such a way that, when projected onto the retina, the visual cortex will fuse the images and extract depth information, based on the above cues. In a simple example, as shown in FIGS. 1A-1C, a stereo pair, consisting of a left image 100 and a right image 102, is displayed on a projection plane 104, such as the plane of a screen or display. The projection plane 104 is also referred to herein as the zero plane, which is the plane of zero depth along an axis extending perpendicular to the projection plane. For a point, the horizontal parallax, between the right and left images 100, 102 in relation to an imaginary center line 108, determines the depth of the point as perceived by the viewer. As used herein, "left" and "right" mean the images presented to the left and right eyes of a viewer, respectively, and not necessarily the position of the images relative to one another. FIG. 1A shows a positive parallax, in which the point 110 is perceived to by behind the zero plane 104. FIG. 1B shows a negative parallax, in which the point 110 appears to be in front of the zero plane 104. FIG. 1C shows a zero parallax, in which the point 110 appears to lie in the zero plane. More generally, the horizontal parallax determines the binocular disparity between images of the point.

An object or element of a scene being rendered in stereoscopic 3-D, such as an object in a 3-D video game or an element of a 3-D user interface, may be animated to move in any direction and at different speeds, either at a fixed velocity or at an accelerating or decelerating speed, depending on the nature of the object and its role or function in the content of the scene. When looking at graphics in 3-D, a viewer's eyes must adjust to appreciate different depths. If an object moves across the screen or only appears briefly, a viewer may experience eye strain when trying to adjust to the quickly changing object, or have insufficient time to recognize the object, analyze the left and right images constituting a stereo pair displaying the object, and determine the depth of the object. Constant adjustments may also be tiresome and are especially difficult when objects have a rate of change of position and/or visibility that exceeds a threshold or satisfies some other criterion. The shorter the time an object is displayed on the screen, the less time a viewer's eyes have to adjust to the depth position. In such cases, a large displacement, and therefore a large 3-D effect, may be problematic for the viewer or may not be fully perceived.

In pre-rendered 3-D content, such as movies, a stereographer or director can modify or compensate for the velocity of objects. However, in the case of interactive 3-D graphics such as video games, user interfaces, or other graphics being rendered in real-time, there is no current mechanism to adjust or compensate for the effects of rapidly changing objects before the content is ultimately rendered and displayed to the viewer.

Figure 2:
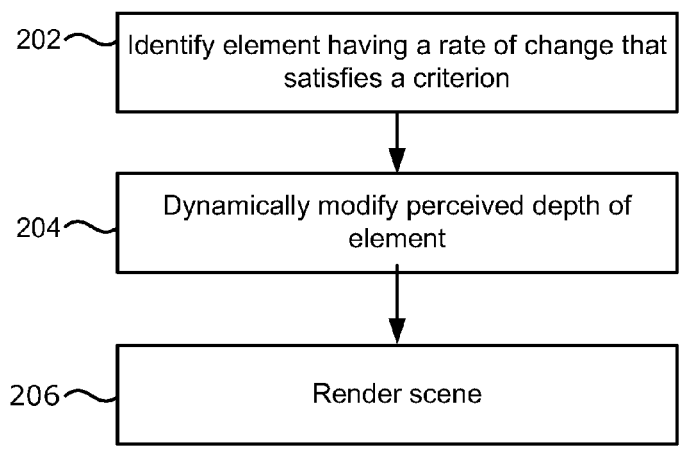
FIG. 2 is a flowchart of an example method according to the present disclosure.

Generally, as shown in FIG. 2, the present disclosure describes a method and system for rendering scenes in stereoscopic 3-D, particularly scenes in which an object or element is changing or moving rapidly, such as an object moving across a display, or an object changing visibility within the scene. The method comprises identifying 202, or detecting, that a rate of change, of one or more elements of a scene to be rendered in stereoscopic 3-D, satisfies a pre-assigned criterion. The perceived depth of at least one element of the scene is then dynamically modified 204, and the scene is rendered 206. For example, an element or object in the scene may be identified as having a rate of change of position or visibility within the scene that satisfies a pre-assigned criterion. An example criterion is: the absolute value of the rate of change exceeds a pre-assigned threshold. Another example criterion is: the rate change of the rate of change exceeds a pre-assigned threshold, say as when an object accelerates. To reduce eye strain of a viewer of the scene, the perceived depth of objects or elements of the scene can be modified while one object is dramatically changing position or visibility. In some cases, the perceived depth of the rapidly changing object may be modified, whereas in other cases the perceived depth of other objects may be modified; in any case, the goal is to reduce the overall range of perceived depths of all objects in the scene during the period when one object is rapidly changing, so that the viewer can perceive the 3-D effect without undue eye strain. According to embodiments, the amount by which the perceived depth is modified can be a function of the identified rate of change.

An object is described as having an associated rate of change of position (i.e. an associated speed) when it moves across the screen or display (i.e. along the x and y axes of the plane of the display), and/or when it appears to change depth (i.e. when the object appears to move along the z-axis perpendicular to the plane of the display).

An object or element is described as having an associated rate of change of visibility when it appears or disappears, or exhibits a change of transparency, texture, shape, colour, or contrast with neighbouring elements. For example, an object is said to have a high rate of change of visibility when it appears momentarily on the screen and disappears from view quickly.

The rate of change of position or visibility of an object may be a known property of the object being rendered, or the rate of change of the object can be determined or calculated based on the position of the object relative to a portion of the screen (such as an edge) over time, its position relative to other objects being rendered on the display, or the total time that the object is shown on the screen before it disappears. In some examples, the total time may be in the order of 1 to 5 seconds, although this range may be arbitrarily assigned and the length of the time period may be outside this range or changed according to a viewer's preferences. As used herein, objects that appear for a short period of time may be referred to as transient objects.

The pre-assigned criterion for rate of change may be (or incorporate) a speed threshold, i.e., a speed at which a viewer begins to encounter difficulty in recognizing and perceiving the object in stereoscopic 3-D. This speed may be arbitrary, or as one of ordinary skill in the art will appreciate, it may be either fixed or customizable so that it can change according to a viewer's preferences. For example, the threshold speed may be set at 0.5 meters per second along the x or y axis for a large TV screen. In some examples, the speed threshold is determined as a function of the moving object's distance from the zero plane. For example, there may be no speed threshold for objects on the zero plane, while the speed threshold for objects positioned (i.e., at a depth of) one meter behind the zero plane may be 0.3 meters per second. In some examples, the speed threshold may be a function of the moving object's distance from the other objects in the scene, such as the scene background. For example, there may be no speed threshold for objects within 0.2 meters from the scene background, while the speed threshold for objects positioned 0.5 meters in front of the scene background may be 0.7 meters per second. As one of ordinary skill will appreciate, these thresholds are examples only, and are not intended to be limiting in any way. Similarly, the pre-assigned criterion for rate of change may be (or incorporate) an acceleration threshold.

Thus, for example, to identify that the rate of change of an object or element satisfies a pre-determined criterion, the following factors may be taken into consideration: the speed of the object, the acceleration of the object, the perceived depth of the object, the length of time the object is visible, and the direction in which the object moves (i.e., along the x, y, or z axes relative to the display). Furthermore, the greater an object's perceived depth differs from the perceived depth of other objects or elements in the scene, the more eye strain a viewer may experience. Therefore, embodiments of the present disclosure may also take into consideration the position of a changing object in relation to other objects or the total range of perceived depths of all objects in the scene.

Figure 3:
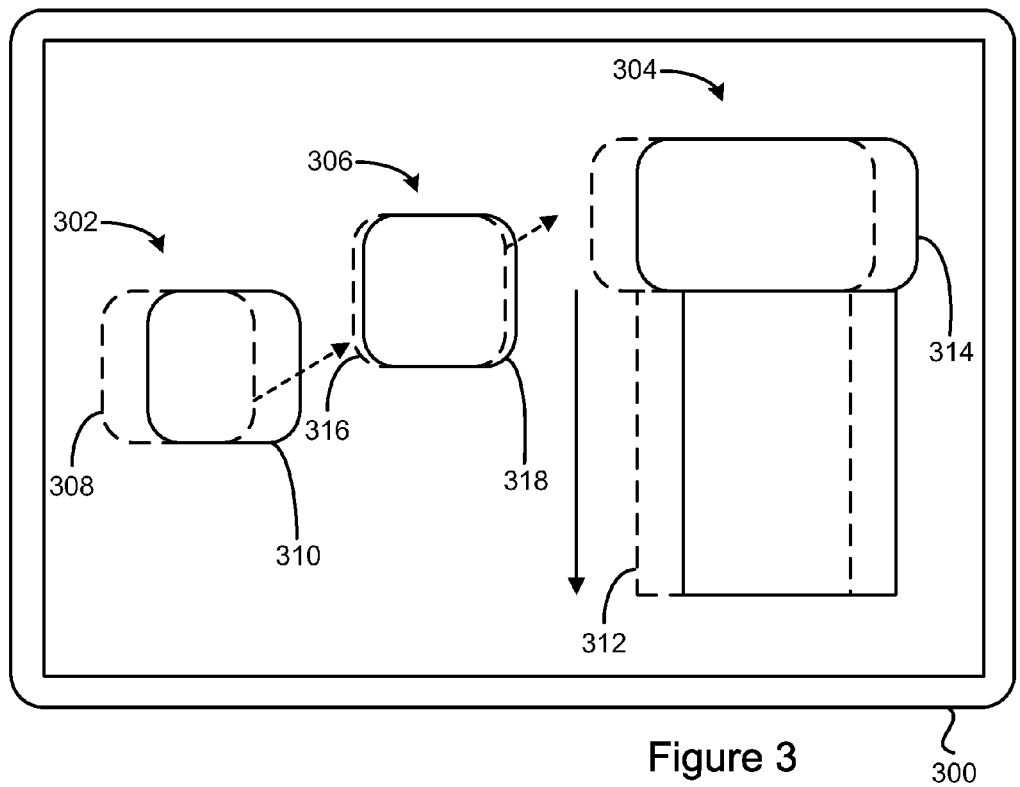
FIG. 3 illustrates a user interface displayed in stereoscopic 3-D according to the present disclosure.
Figure 4A:
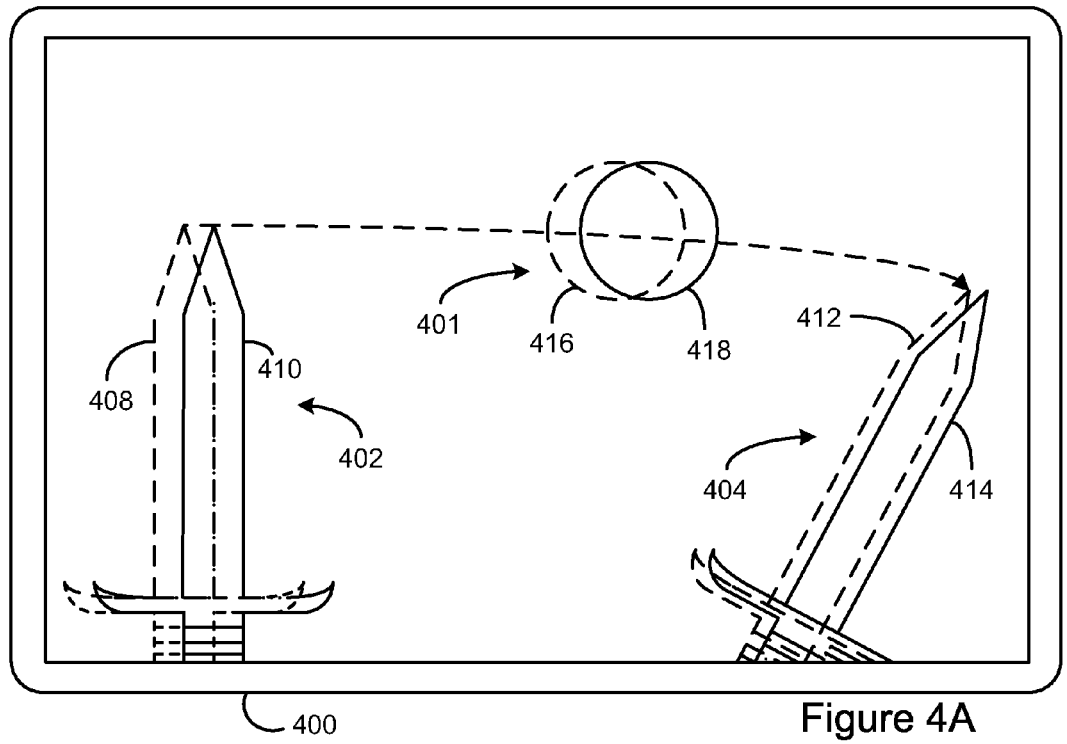
FIGS. 4A and 4B illustrate a video game animation displayed in stereoscopic 3-D according to the present disclosure.
Figure 4B:
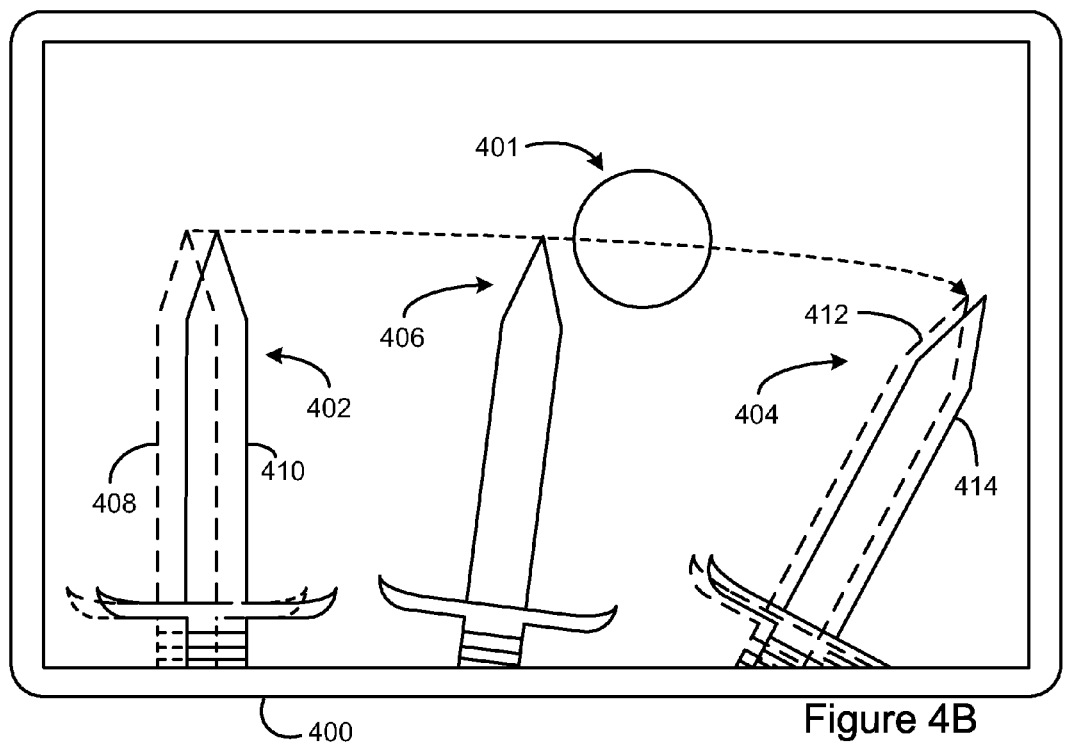

The present method is shown by example in FIGS. 3, 4A and 4B. FIG. 3 shows an example of a user interface ("UI") rendered in stereoscopic 3-D on a display 300. An element, such as icon, menu item, or other object in the UI, is animated, such as in response to a user dragging the element, to move from an initial position 302 to a final position 304, where it expands horizontally and vertically to display a "pulldown" menu. Between the initial and final positions 302, 304, the element is moving at a speed determined by, for example, the speed at which a user swipes a finger across the display. The element as shown at position 306 is intended to depict the element in motion, and the speed at which the element moves is identified as being greater than a threshold.

At position 302, the element is perceived as having a three-dimensional depth as determined by the binocular disparity between left and right images 308, 310 of the object. The binocular disparity is illustrated as an offset between the images; however, as will be appreciated by those of skill in the art, the left and right images constituting a stereo pair may also include differences in perspective (not shown). As shown, the object at its final position 304 has a similar binocular disparity, as shown by the offset between left and right images 312, 314. At intermediate position 306 the binocular disparity between the left and right images 316, 318 is modified, as shown by the reduced offset between the left and right images 316, 318, to bring the perceived depth of the element closer to the zero plane, thereby reducing eye strain.

The perceived depth of the element may be dynamically modified as a function of the rate of change. As the element travels from position 302 to position 304, the binocular disparity between left and right images of the element can be modified such that the element is perceived to have a depth that is either fixed or customizable according to a viewer's preferences. The change in binocular disparity may be continuous or step-wise, in relation to changes in speed of the element. According to an example, the offset may be reduced to zero or a nominal value, such that stereoscopic 3-D depth effects are removed from the element while it is in motion.

FIG. 4A shows an example of a video game rendered in stereoscopic 3-D on display 400. The content being rendered includes a 3-D game object, which in this case is shown as a sword. In the example shown, the sword is intended to slash through a ball 401 as the sword moves across the screen during an animation actuated by a viewer while playing the game. The sword moves from an initial position 402 to a final position 404 at a speed beyond a given threshold or pre-assigned maximum speed. At the initial position 402, the sword has a perceived depth resulting from binocular disparity between left and right images 408, 410, shown as the offset between the left and right images 408, 410. As illustrated, the sword has a similar perceived depth at its the final position 404, as illustrated by the offset images 412, 414. The ball is also at a perceived depth, as determined by the binocular disparity between offset images 416, 418.

FIG. 4B shows the scene when the sword is in motion and interacts with the ball 401. Since the sword has been identified as having a speed that exceeds a given threshold, the binocular disparity of the sword, at intermediate position 406, is modified, such as to bring the perceived depth of the sword to the zero plane by reducing the binocular disparity to zero, as shown. However, as will be apparent, in order for the sword to appear to slash through the ball, the perceived depth of the ball 401 must also be modified to be in the same plane as the sword. Accordingly, as shown, the perceived depth of the ball 401 is also brought to the zero plane by removing binocular disparity between left and right images of the ball.

The perceived depth of the sword and the ball 401, while the sword is in motion, may be reduced by any amount that makes the sword in motion easier for a viewer to see. More generally, if an object or element of a scene interacts with other objects in a scene, the perceived depth of the other objects, or the whole scene, including background and foreground objects, may be modified while the object is in motion. Similarly, if more than one object or element is identified as having a rate of change satisfying a pre-assigned criterion, or if the relative rate of speed of two or more objects satisfies a pre-assigned criterion, the perceived depth of the identified objects, any subset of objects in the scene (e.g. all objects or elements within a certain distance of the identified object(s)), or all objects or elements in the scene, can be modified. As an example, if an element of a scene is identified as having a rate of change that satisfies the pre-assigned criterion, all elements of the scene can be "flattened" (i.e. brought to a similar perceived depth relative to the zero plane) while the identified element continues to change at a rate satisfying the pre-assigned criterion.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure may be represented as a computer program product stored in a tangible, non-transitory machine-readable medium (also referred to as a computer-readable medium, a processor-readable medium, or a computer usable medium having a computer-readable program code embodied therein). The machine-readable medium may be any suitable tangible, non-transitory medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations may also be stored on the machine-readable medium. The instructions stored on the machine-readable medium may be executed by a processor or other suitable processing device, and may interface with circuitry to perform the described tasks.

Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks. The machine-readable medium may also contain a database for storing any other information required for the operation of the above examples, including, but not limited to, the snapshot and any information regarding spatial interrelationships between nodes and/or positional relationships relative to pixels.

Embodiments of the disclosure may also be implemented as a device or system having a processor or microprocessor, and a display. For example, embodiments of the disclosure may be implemented in a general purpose computer, or an electronic device, such as a television projection screen, wirelessly enabled notebook computer, tablet computer, mobile internet device, electronic navigation device, and so forth, where the processor is configured to execute the described method.

The above-described embodiments are intended to be examples only. Alterations, modifications and variations can be effected to the particular embodiments by those of skill in the art without departing from the scope, which is defined solely by the claims appended hereto.

What is claimed is:

1. A computer-implemented method of rendering in stereoscopic 3-D a scene comprising a plurality of frames, the computer-implemented method comprising:

determining, in dependence only on the plurality of frames comprised by the scene in stereoscopic 3-D, that a rate of change of a first element of the stereoscopic 3-D scene exceeds a predefined threshold, wherein the first element has a perceived depth, and said rate of change comprises a rate of change of visibility within the stereoscopic 3-D scene;

identifying a second element of the stereoscopic 3-D scene interacting with the first element, and the second element has a perceived depth;

in response to determining that the rate of change of the first element exceeds the predefined threshold, dynamically modifying the perceived depth of the first element and the perceived depth of the second element in the stereoscopic 3-D image such that the perceived depth of the first element and the perceived depth of the second element are similar; and rendering the scene;

wherein identifying that said rate of change satisfies a criterion, dynamically modifying the perceived depths, and rendering the scene occur substantially in real-time.

2. The method of claim 1, wherein the first element comprises the second element.

3. The method of claim 1, wherein dynamically modifying the perceived depth comprises dynamically modifying the perceived depth as a function of the rate of change.

4. The method of claim 1, wherein dynamically modifying the perceived depth comprises dynamically modifying a stereo pair comprising a left image and a right image of the second element.

5. The method of claim 4, wherein dynamically modifying the stereo pair comprises dynamically reducing binocular disparity between the left and right images.

6. The method of claim 5, wherein dynamically reducing binocular disparity comprises dynamically reducing binocular disparity as a function of the rate of change.

7. The method of claim 1, wherein dynamically modifying the perceived depth comprises dynamically reducing the perceived depth in relation to a zero-plane of a display.

8. A system for displaying content in stereoscopic 3-D, the system comprising:

a display, and a processor configured to:

determine, in dependence only on a plurality of frames comprised by a scene in stereoscopic 3-D, that a rate of change of a first element of the stereoscopic 3-D scene exceeds a predefined threshold, wherein the first element has a perceived depth, and said rate of change comprises a rate of change of visibility within the stereoscopic 3-D scene;

identify a second element of the stereoscopic 3-D scene interacting with the first element, wherein the second element has a perceived depth;

in response to determining that the rate of change of the first element exceeds the predefined threshold, dynamically modify the perceived depth of the first element and the perceived depth of the second element in the stereoscopic 3-D image such that the perceived depth of the first element and the perceived depth of the second element are similar; and render the scene to the display;

wherein identifying that said rate of change satisfies a criterion, dynamically modifying the perceived depths, and rendering the scene occur substantially in real-time.

9. The system of claim 8, wherein the first element comprises the second element.

10. The system of claim 8, wherein to dynamically modify the perceived depth the processor is configured to dynamically modify the perceived depth as a function of the rate of change.

11. The system of claim 8, wherein to dynamically modify the perceived depth the processor is configured to dynamically modify a stereo pair comprising a left image and a right image of the second element.

12. The system of claim 11, wherein to dynamically modify the stereo pair the processor is configured to dynamically reduce binocular disparity between the left and right.

13. The system of claim 12, wherein to dynamically reduce binocular disparity the processor is configured to dynamically reduce binocular disparity as a function of the rate of change.

14. The system of claim 8, wherein to dynamically modify the perceived depth the processor is configured to dynamically reduce the perceived depth in relation to a zero-plane of a display.

15. A non-transitory computer-readable medium storing instructions, which, when executed, cause a processor to execute a method of rendering content in stereoscopic 3-D, the method comprising:

determining, in dependence only on the plurality of frames comprised by the scene in stereoscopic 3-D, that a rate of change of a first element of the stereoscopic 3-D scene exceeds a predefined threshold, wherein the first element has a perceived depth, and said rate of change comprises a rate of change of visibility within the stereoscopic 3-D scene;

identifying a second element of the stereoscopic 3-D scene interacting with the first element, and the second element has a perceived depth;

in response to determining that the rate of change of the first element exceeds the predefined threshold, dynamically modifying the perceived depth of the first element and the perceived depth of the second element in the stereoscopic 3-D image such that the perceived depth of the first element and the perceived depth of the second element are similar; and rendering the scene;

wherein identifying that said rate of change satisfies a criterion, dynamically modifying the perceived depths, and rendering the scene occur substantially in real-time.

16. The computer-readable medium of claim 15, wherein the first element comprises the second element.

17. The computer-readable medium of claim 15, wherein dynamically modifying the perceived depth comprises dynamically modifying the perceived depth as a function of the rate of change.

18. The computer-readable medium of claim 15, wherein dynamically modifying the perceived depth comprises dynamically modifying a stereo pair.

19. The computer-readable medium of claim 18, wherein dynamically modifying the stereo pair comprises dynamically reducing binocular disparity between the between left and right images of the stereo pair.

20. The computer-readable medium of claim 19, wherein dynamically reducing binocular disparity comprises reducing binocular disparity as a function of the rate of change.

* * * * *